US009357474B2

(12) United States Patent
 Arora

(10) Patent No.: US 9,357,474 B2
(45) Date of Patent: May 31, 2016

(54) DEVICE AND METHOD FOR PUBLIC LAND MOBILE NETWORK SEARCHING

(71) Applicant: Intel Corporation, Santa Clara, CA (US)

(72) Inventor: Amit Arora, Gurgaon (IN)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 14/144,856

(22) Filed: Dec. 31, 2013

(65) Prior Publication Data

US 2015/0189575 A1    Jul. 2, 2015

(51) Int. Cl.
 *H04W 48/16* (2009.01)
 *H04W 84/04* (2009.01)
 *H04B 1/38* (2015.01)

(52) U.S. Cl.
 CPC ............... *H04W 48/16* (2013.01); *H04B 1/38* (2013.01); *H04W 84/042* (2013.01)

(58) Field of Classification Search
 CPC ....... H04W 84/042; H04W 48/16; H04B 1/38
 USPC .................. 455/418, 434, 456.1, 456.3, 466
 See application file for complete search history.

(56) References Cited

U.S. PATENT DOCUMENTS

2012/0190361 A1    7/2012  Shaikh et al.
2013/0040661 A1*   2/2013  Grube et al. ............. 455/456.3

FOREIGN PATENT DOCUMENTS

| CN | 104754700 A     | 7/2015 |
| EP | 2211577 A1      | 7/2010 |
| EP | 2903350 A1      | 8/2015 |
| WO | WO-02076117 A2  | 9/2002 |
| WO | WO-2007103975 A2| 9/2007 |

OTHER PUBLICATIONS

"European Application Serial No. 14194542.8, Extended European Search Report mailed Jul. 2, 2015", 7 pgs.

* cited by examiner

*Primary Examiner* — Sam Bhattacharya
(74) *Attorney, Agent, or Firm* — Schwegman Lundberg & Woessner, P.A.

(57) ABSTRACT

This disclosure relates generally to public land mobile network searching. A device, method, and/or system may include for each of at least one mobile network identity, each mobile network identity separately associated to a different mobile network, sequentially assessing, with a processor, for each mobile network identity, identity information sets corresponding to one of the at least one mobile network identity for a location code corresponding to the mobile network associated with the one of the mobile network identities, presenting, on a user interface, information related to the mobile network corresponding to the location code as identified. Upon the location code corresponding to the mobile network having been identified, the processor ceases assessing identity information sets corresponding to the mobile network identity for the location code.

24 Claims, 5 Drawing Sheets

DEVICE AND METHOD FOR PUBLIC LAND MOBILE NETWORK SEARCHING

TECHNICAL FIELD

The disclosure herein relates generally to devices, systems, and/or methods for public land mobile network searching.

BACKGROUND

The selection of a public land mobile network (PLMN) and may involve user equipment (UE) selecting a network operator for receiving services, such as data services and/or voice services. The UE may scan a predetermined set of frequencies over the UE's band of operation, such as all of the frequencies over the band of operation. Upon completion scanning the predetermined set of frequencies, the UE may identify a location code corresponding to the PLMN and utilize the location code to initiate communication with the PLMN. In various circumstances, PLMN searching may proceed automatically, with PLMNs searched and a highest one of the PLMNs identified selected for communication. Additionally or alternatively, a list of the PLMNs as identified may be presented to a user and the user may select one of the PLMNs for obtaining service.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A PLMN search may include the UE receiving a request from upper layers, such as a user command or high level systems or devices, to start the PLMN search. The UE may send a request for the receive signal level (RxLev) on the predetermined frequencies in the band of operation. The UE may sort the list of frequencies in order of RxLev as determined from the requests. The UE may scan the list of frequencies sequentially; if the scan is successful the UE may decode the SI3 of that particular frequency and either store the associated PLMN on a list or, if the prioritized PLMN has been identified, the search may be ceased.

However, such a sequence may produce circumstances where, within a specific location, a UE may find frequencies which belong to the same PLMN. Because the UE may simply scan all of the frequencies the UE may not be sensitive to which frequencies belong to the same PLMN. Such a procedure may waste of time and resources.

A UE, system, and method have been developed that sequentially scan identity information sets corresponding to mobile network identities, each mobile network identity associated with a mobile network. Each mobile network corresponds to a location code. The identity information sets may be scanned for a location code corresponding to the mobile network associated with the mobile network identity. Upon identifying the location code corresponding to the mobile network, the UE may ceases scanning the identity information sets corresponding to the mobile network identity of the mobile network and moves on to the subsequent identity information sets corresponding to a different mobile network if the identity information sets corresponding to any mobile networks remain unscanned.

Figure 1:
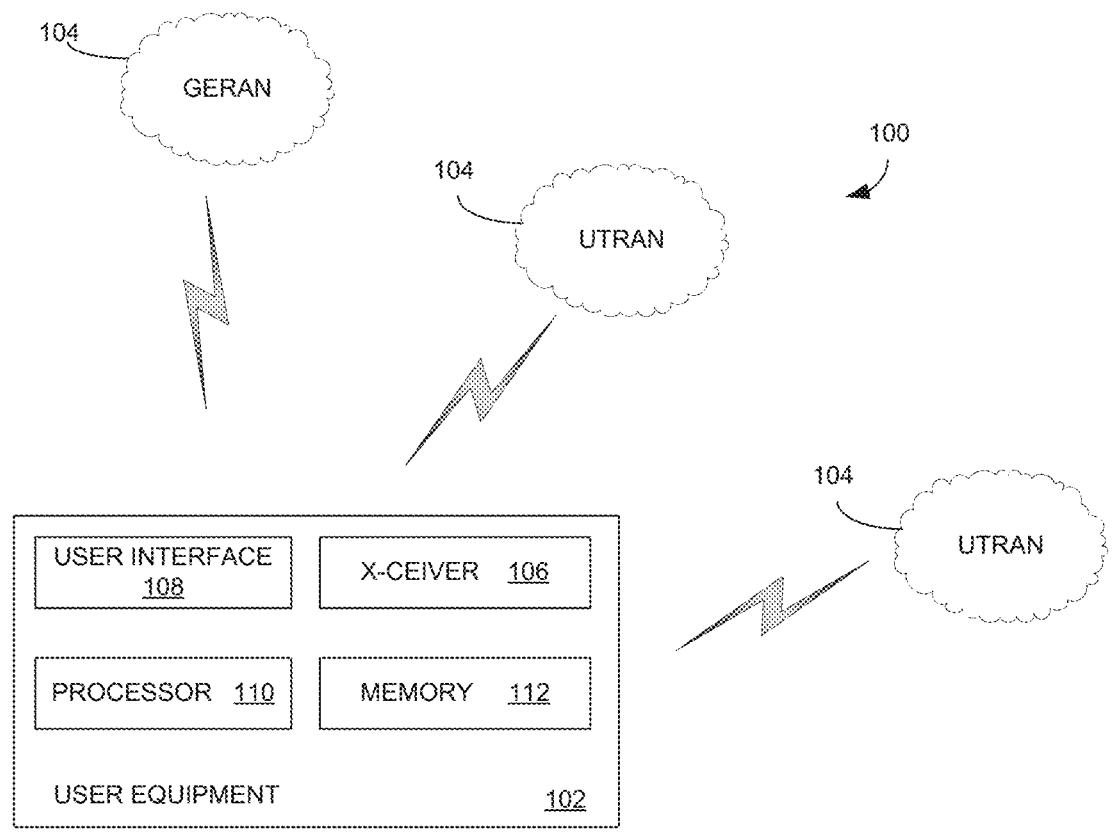
FIG. 1 is a block diagram a system including a UE and multiple mobile networks, in an example embodiment.

FIG. 1 is a block diagram a system 100 including a UE 102 and multiple mobile networks 104, in an example embodiment. The UE 102 may be a cellular or mobile telephone or any other device that may be configured to communicate with a mobile network 104. The mobile networks 104 may be PLMNs or any other suitable mobile network. The mobile networks 104 may be 2G mobile networks, 3G mobile networks, or may operate according to any of a variety of standards known in the art. The mobile networks 104 may incorporate hardware and software components that allow the mobile networks 104 to engage in wireless communications as known in the art.

The UE 102 includes a transceiver 106 configured to transmit and receive wireless signals with the mobile networks 104 according to the protocols of the various mobile networks 104. The transceiver 106 may be configured to communicate according to 2G standards, 3G standards, or any other wireless mobile network standard that has been or may be developed. The capabilities and configuration of the transceiver 106 may dictate which mobile networks 104 the UE 102 may communicate with.

The UE 102 further includes a user interface 108, such as a visual display, an audio input/output, and a tactile input/output, such as some or all of a touchscreen, a keyboard, and the like, and ports and/or jacks for connecting with peripheral electronic devices and/or components. The UE 102 further includes a processor 110, such as a microprocessor, a controller, or other electronic componentry configured to perform computations or electronic processing. An electronic memory 112 is configured to store electronic information and files, as disclosed herein. The electronic memory 112 may include random access memory (RAM), flash memory, read only memory (ROM), a hard disk, and other forms of electronic memory and/or electronic storage known in the art.

Figure 2:
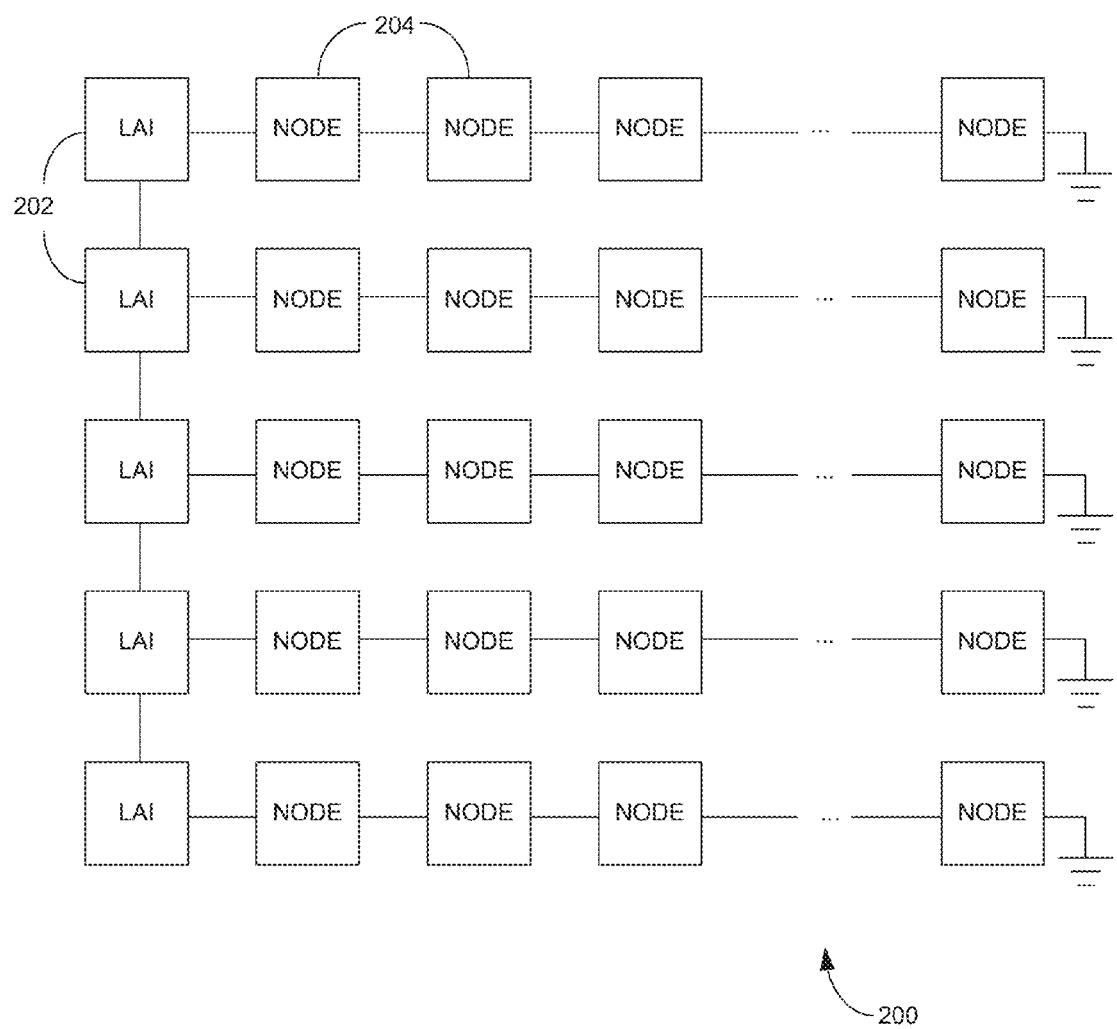
FIG. 2 is a hash table that may be maintained by the UE, in an example embodiment.

FIG. 2 is a hash table 200 that may be maintained by the UE 102, in an example embodiment. The hash table 200 may be accessed by the processor 110 of the UE 102. The hash table 200 may be stored in the electronic memory 112 of the UE 102 or may be stored remote to the UE 102 and accessed remotely by the processor 110 or by another processor 110 accessible by the UE 102. The processor 110 and/or the electronic memory 112 may be or may be supplemented by cloud processors and/or electronic memory.

The hash table 200 may include identity information sets including location area identities (LAI) 202 as obtained by the UE 102, as disclosed herein. Each LAI 202 may include a mobile country code (MCC), a mobile network code (MNC), and a location area code (LAC). Some or all of the LAIs 202 may include a timestamp when an immediate preceding scan was triggered for the corresponding LAI 202. In various examples, the timestamp may measure the time since the preceding scan in days.

Some or all of the LAIs 202 may be obtained as part of an information broadcasted by a mobile network 104 or a component of a mobile network 104. In an example, the LAIs 202 may be transmitted as part of System Information 3 (SI3) broadcasted on a broadcast control channel (BCCH) from a corresponding mobile network 104. The BCCH may carry a repeating pattern of system information messages that identity a base transceiver station and an absolute radio frequency channel number (ARFCN). Each LAI 202, such as an LAI index, may also contain a list of nodes 204 containing information about the BCCH ARFCN and cell identification belonging to the LAI 202. The hash table 200 is indexed by LAI 202 and maintains, in the nodes 204 corresponding to LAI 202, the cell identification and BCCH ARFCN for each LAI 202.

The LAIs 202 are organized in the hash table 200 according to a hash function, wherein Index=HashFunction(LAI). Once the SI3 is decoded for a particular mobile network 104 belonging to a particular LAC, the BCCH ARFCN and cell identification may be searched. If the BCCH ARFCN and cell identification are identified then all of the remaining BCCH ARFCNs may be left out from scanning since such BCCH ARFCNs may belong to the same mobile network 104 that has already been scanned and identified. The process can be repeated until all of the mobile networks 104 have been identified or until a prioritized or predetermined mobile network 104 has been identified.

Figure 3:
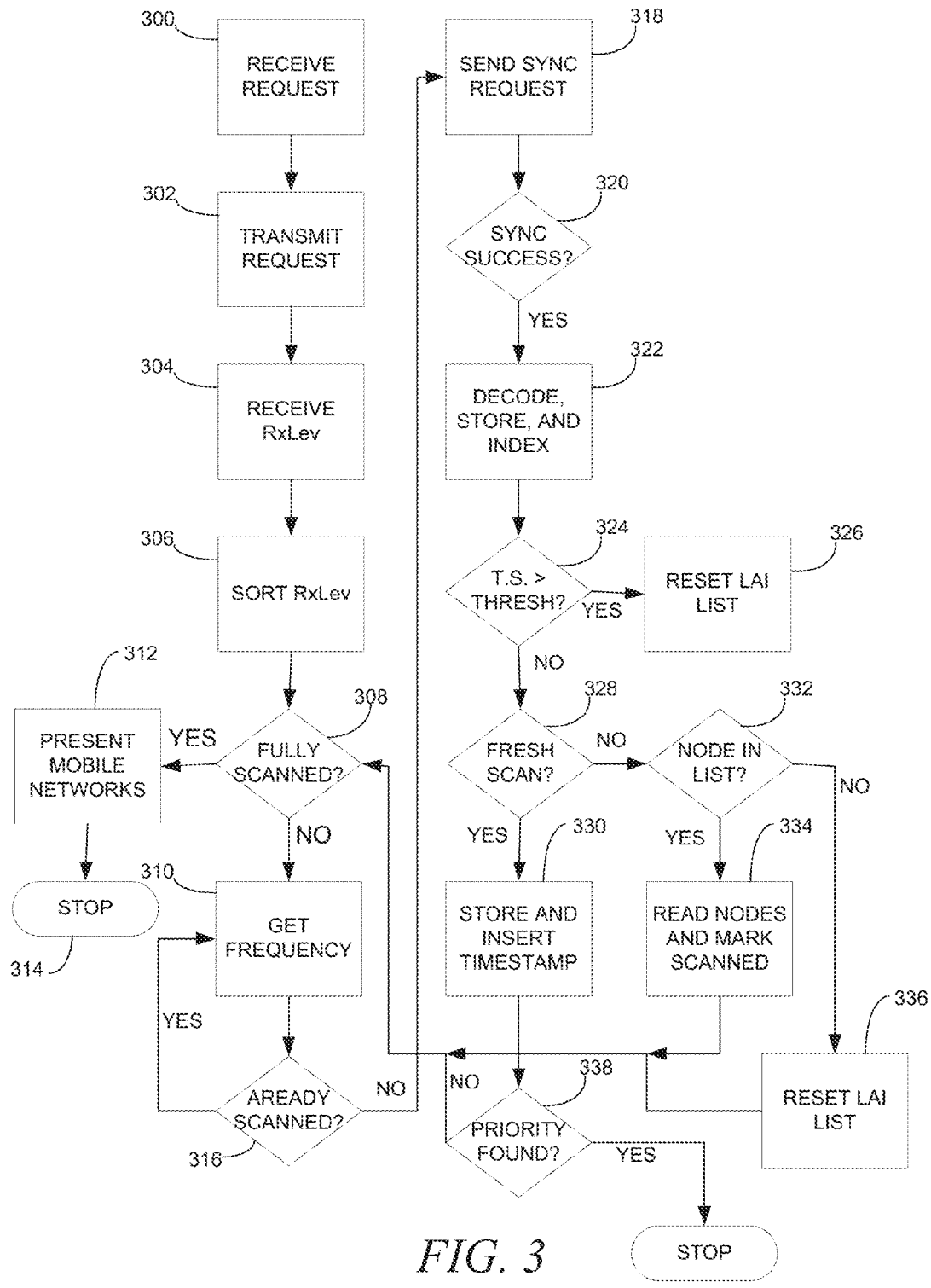
FIG. 3 is a flowchart for identifying mobile networks, in an example embodiment.

FIG. 3 is a flowchart for identifying mobile networks, in an example embodiment. The mobile networks may be the mobile networks 104 and may be identified by the UE 102, or may be any other suitable mobile network and/or may be identified by any other suitable electronic device.

At 300, a request for a mobile network list is received by the processor. The request may be manually generated by a user or may be automatically generated, such as part of a communication initiation command or as a periodic refreshing of the mobile network list.

At 302, the UE transmits a request, such as a MPH_RXLEV_REQ, over some or all of the bands supported by the UE. At 304, the list of RxLev received from the request is stored, such as in the electronic memory. At 306, the list of RxLev is sorted in order of RxLev strength. At 308, it is determined if the RxLev list has been fully scanned by the processor. If not, at 310 a mobile network frequency is obtained from a mobile network list. If so, at 312 the decoded mobile networks are presented on a user interface of the UE and the flowchart stops at 314.

Resuming from 310, at 316, if the mobile network frequency has already been scanned then 310 is returned to and a new frequency is obtained from the mobile network list. At 318, if the frequency has not already been scanned then an MPH_PLMN_SYNC_REQ is transmitted to the mobile network. At 320, the UE may wait until the sync request is successful or times out. At 322, the SI3 provided by the mobile network is decoded and the mobile network information to be reported to the user interface at 312 is stored in the electronic memory as indexed in the hash table (if the mobile network information has already been indexed additional mobile network information may not be stored or may be overwritten on the previously stored mobile network information, in various examples).

At 324, if the LAI last scanned has a timestamp greater than a threshold time, then at 326 the LAI list is reset and marked for fresh scanning. Otherwise, at 328, if the LAI is marked for fresh scanning then at 330 the cell identification and BCCH ARFCN are stored in the list and the time stamp is inserted. Otherwise, at 332, if the cell identification and the BCCH ARFCN are found on the list then at 334 all of the BCCH ARFCNs in the list are read and marked as "mobile network already scanned" in the RxLev list. Otherwise, at 336, the LAI list is reset. The cell identification and BCCH ARFCN are stored in the electronic memory and the list is marked for fresh scanning. Optionally, after 330, at 338, if a priority or predetermined mobile network is identified then the flowchart may stop, i.e., additional mobile networks are not identified.

Figure 4:
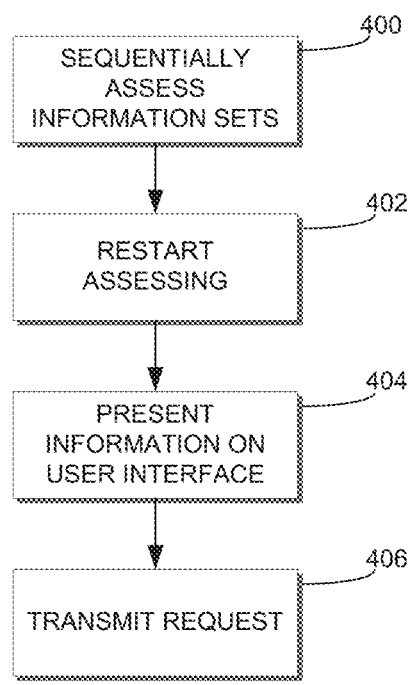
FIG. 4 is a flowchart for searching mobile networks, in an example embodiment.

FIG. 4 is a flowchart for storing radio access technology information, in an example embodiment. The flowchart may be used with respect to the system 100 or any other suitable network or system.

At 400, for each of at least one mobile network identity, each mobile network identity separately associated to a different mobile network, identity information sets for each mobile network identity corresponding to one of the at least one mobile network identity are sequentially assessed for a location code corresponding to the mobile network associated with the one of the mobile network identities. Upon the location code corresponding to the mobile network having been identified, the processor ceases assessing identity information sets corresponding to the mobile network identity for the location code. In an example, the identity information sets are stored as a hash table in an electronic memory. In an example, upon a location code of a predetermined priority mobile network having been identified the processor ceases assessing identity information sets. In an example, the information is an identification of the mobile network.

In an example, the identity information sets include at least some of a broadcast control channel of a mobile network, an absolute radio frequency channel number of the mobile network, and a cell identification for the mobile network. In an example, at least some of the identity information sets include a timestamp, and wherein sequentially assessing the identity information sets includes sequentially assessing the identity information sets until a timestamp exceeds a predetermined threshold time. In an example, the mobile network identities include at least one of a mobile country code, a mobile network code, and a location area code.

At 402, the sequential assessing of the identity information sets are restarted upon identifying the timestamp that exceeds the predetermined threshold time. In an example, presenting includes presenting information pertaining to all mobile networks corresponding to location codes as identified.

At 404, information related to the mobile network corresponding to the location code as identified is caused to be presented on a user interface.

At 406, a request is transmitted from a transceiver for at least one of the mobile networks to reply on a predetermined frequency supported by the transceiver, and storing a received reply from a mobile network in an electronic memory.

Figure 5:
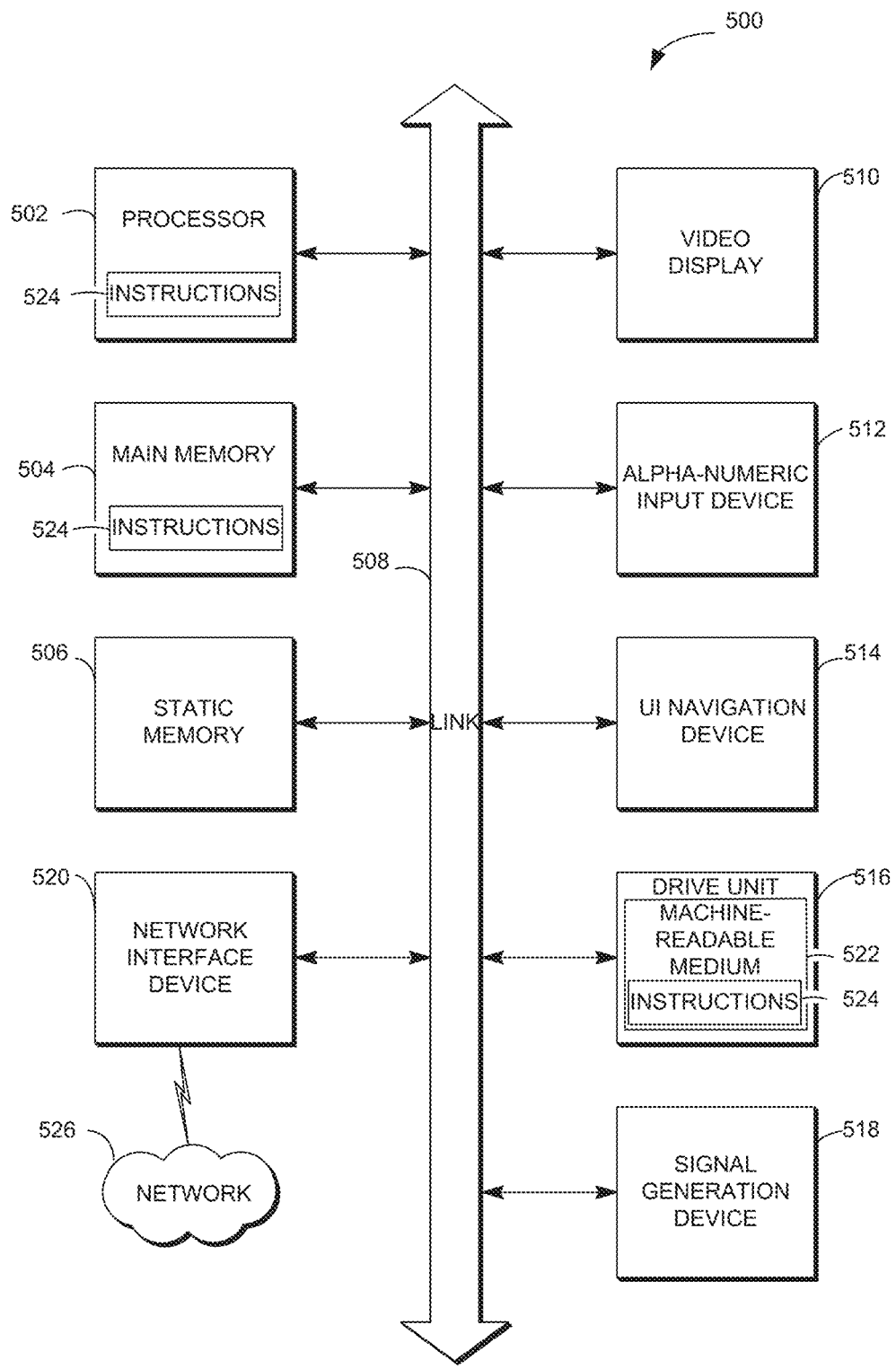
FIG. 5 is a block diagram illustrating components of a machine, according to some example embodiments.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system and within which instructions 524 (e.g., software) for causing the machine 500 to perform any one or more of the methodologies discussed herein may be executed. In alternative embodiments, the machine 500 operates as a standalone device or may be connected (e.g., networked) to other machines. In a networked deployment, the machine 500 may operate in the capacity of a server machine or a client machine in a server-client network environment, or as a peer machine in a peerto-peer (or distributed) network environment. The machine 500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 524, sequentially or otherwise, that specify actions to be taken by that machine. Further, while only a single machine is illustrated, the term "machine" shall also be taken to include a collection of machines that individually or jointly execute the instructions 524 to perform any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The machine 500 may further include a graphics display 510 (e.g., a plasma display panel (PDP), a light emitting diode (LED) display, a liquid crystal display (LCD), a projector, or a cathode ray tube (CRT)). The machine 500 may also include an alphanumeric input device 512 (e.g., a keyboard), a cursor control device 514 (e.g., a mouse, a touchpad, a trackball, a joystick, a motion sensor, or other pointing instrument), a storage unit 516, a signal generation device 518 (e.g., a speaker), and a network interface device 520.

The storage unit 516 includes a machine-readable medium 522 on which is stored the instructions 524 (e.g., software) embodying any one or more of the methodologies or functions described herein. The instructions 524 may also reside, completely or at least partially, within the main memory 504, within the processor 502 (e.g., within the processor's cache memory), or both, during execution thereof by the machine 500. Accordingly, the main memory 504 and the processor 502 may be considered as machine-readable media. The instructions 524 may be transmitted or received over a network 526 via the network interface device 520. The network interface device 520 may be a wired transceiver or a wireless transceiver, including one or more transceivers that may be utilized in a cellular or mobile network, such as the mobile network 100.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method, comprising:
    for each of at least one mobile network identity, each mobile network identity separately associated with and identifying a different mobile network, sequentially assessing, with a processor, identity information sets corresponding to one of the at least one mobile network identity for a location code corresponding to the mobile network associated with the one of the mobile network identities; and
    presenting, on a user interface, information related to the mobile network corresponding to the location code as identified;
    wherein, upon the location code corresponding to the mobile network having been identified, the processor ceases assessing identity information sets corresponding to the mobile network identity for the location code.

2. The method of claim 1, wherein the identity information sets are stored as a hash table in an electronic memory.

3. The method of claim 2, wherein the identity information sets include at least some of a broadcast control channel of a mobile network, an absolute radio frequency channel number of the mobile network, and a cell identification for the mobile network.

4. The method of claim 2, wherein at least some of the identity information sets include a timestamp, and wherein sequentially assessing the identity information sets includes sequentially assessing the identity information sets until a timestamp exceeds a predetermined threshold time.

5. The method of claim 4, further comprising restarting the sequential assessing of the identity information sets upon identifying the timestamp that exceeds the predetermined threshold time.

6. The method of claim 1, wherein the mobile network identities include at least one of a mobile country code, a mobile network code, and a location area code.

7. The method of claim 1, wherein upon a location code of a predetermined priority mobile network having been identified the processor ceases assessing identity information sets.

8. The method of claim 1, wherein presenting includes presenting information pertaining to all mobile networks corresponding to location codes as identified.

9. The method of claim 1, wherein the information is an identification of the mobile network.

10. The method of claim 1, further comprising transmitting, from a transceiver, a request for at least one of the mobile networks to reply on a predetermined frequency supported by the transceiver, and storing a received reply from a mobile network in an electronic memory.

11. A user equipment for a mobile network, comprising:
a transceiver configured to receive identity information sets for each of at least one mobile network identity, each mobile network identity separately associated with and identifying a different mobile network;
an electronic memory, coupled to the transceiver, configured to store the identity information sets as received by the transceiver; and
a processor, coupled to the electronic memory, configured to sequentially assess, for each mobile network identity, the identity information sets for a location code corresponding to the mobile network associated with the mobile network identity;
wherein, upon the location code corresponding to the mobile network having been identified, the processor ceases assessing identity information sets corresponding to the mobile network identity for the location code; and
wherein the processor is configured to cause a user interface to present information related to the mobile network corresponding to the location code as identified.

12. The user equipment of claim 11, wherein the identity information sets are stored as a hash table in the electronic memory.

13. The user equipment of claim 12, wherein the identity information sets include at least some of a broadcast control channel of a mobile network, an absolute radio frequency channel number of the mobile network, and a cell identification for the mobile network.

14. The user equipment of claim 12, wherein at least some of the identity information sets include a timestamp, and wherein the processor is configured to sequentially assess the identity information sets by, at least in part, sequentially assessing the identity information sets until a timestamp exceeds a predetermined threshold time.

15. The user equipment of claim 14, wherein the processor is further configured to restart the sequential assessing of the identity information sets upon identifying the timestamp that exceeds the predetermined threshold time.

16. The user equipment of claim 11, wherein the mobile network identities include at least one of a mobile country code, a mobile network code, and a location area code.

17. The user equipment of claim 11, wherein upon a location code of a predetermined priority mobile network having been identified the processor ceases assessing identity information sets.

18. The user equipment of claim 11, the processor is further configured to cause the user interface to present information pertaining to all mobile networks corresponding to location codes as identified.

19. The user equipment of claim 11, wherein the information is an identification of the mobile network.

20. The user equipment of claim 11, wherein the transceiver is further configured to transmit a request for at least one of the mobile networks to reply on a predetermined frequency supported by the transceiver, and wherein the electronic memory is further configured to store a reply received from a mobile network.

21. The method of claim 3, further comprising:
cease assessing identity information sets that include an identified broadcast control channel, an identified absolute radio frequency channel number, and an identified cell identification for a particular mobile network.

22. A non-transitory computer-readable storage medium that stores instructions for execution by one or more processors of a user equipment (UE), the one or more processors to configure the UE to:
for each of at least one mobile network identity, sequentially assess identity information sets corresponding to one of the at least one mobile network identity for a location code corresponding to a mobile network associated with the one of the mobile network identities, each mobile network identity separately associated to a different mobile network;
upon the location code corresponding to the mobile network having been identified, cease assessing identity information sets corresponding to the mobile network identity for the location code; and
present information related to the mobile network corresponding to the location code as identified.

23. The medium of claim 22, wherein the one or more processors further configure the UE to cease assessing identity information sets that include an identified broadcast control channel, an identified absolute radio frequency channel number, and an identified cell identification for a particular mobile network.

24. The medium of claim 22, wherein:
at least some of the identity information sets include a timestamp, and
the one or more processors further configure the UE to:
sequentially assess the identity information sets until a timestamp exceeds a predetermined threshold time, and
restart sequential assessment of the identity information sets upon identifying the timestamp that exceeds the predetermined threshold time.

* * * * *